Patented Nov. 6, 1923.

1,472,781

UNITED STATES PATENT OFFICE.

ABRAHAM BAEWSKIN, OF CHICAGO, ILLINOIS.

WELDING OR SOLDERING COMPOSITION.

No Drawing.  Application filed February 17, 1923. Serial No. 619,765.

*To all whom it may concern:*

Be it known that I, ABRAHAM BAEWSKIN, a citizen of the United States, and a resident of the city of Chicago, county of Cook, and State of Illinois, have invented certain new and useful Welding or Soldering Compositions, of which the following is a specification.

My invention relates to a welding or soldering composition, and the object is to provide a composition of matter for welding or soldering articles of gold, silver and their alloys, in an economical and effective manner.

The above object and other advantageous objects and ends, will become apparent from the following disclosure.

The preferred form of my composition comprises substantially the following ingredients in the following proportions, by measure:

Zinc phosphide, 7 parts; zinc oxide, 3½ parts; sodium bicarbonate, 14 parts; boracic acid, 10½ parts.

To the above ingredients I preferably also add vaseline, which is used as a carrying agent or vehicle for the other ingredients and to render the composition plastic or in the form of a paste, substantially 10 to 20 parts of vaseline are required for the above ingredients in the above proportions; but any other suitable substances may be used in place of the vaseline as a carrying agent and in a suitable quantity to furnish the composition in the plastic form, such other substances may be any suitable liquid or semi-liquid and even water. The vaseline is, however, preferred as the carrying agent, and appears to enhance the welding properties of the preceding ingredients.

The composition may be made by omitting the vaseline or other carrying agent, and using the four first recited ingredients alone. The composition, with only the first four ingredients when mixed without the carrying agent will appear in the form of a powder, instead of a paste.

The ingredients are all thoroughly mixed together, and the composition is then applied to the parts to be welded, said parts being then pressed together and heated in a flame until completely welded, in the usual manner.

While I have described the preferred manner of preparing my composition, this is capable of variation and modification without departing from the spirit of my invention. I, therefore, do not wish to be limited to the precise ingredients set forth and the manner of compounding the same, but desire to avail myself of such variations and modifications as come within the scope of the appended claims.

Having described my invention, what I claim as new and desire to secure by Letters Patent is:

1. A composition of the class described including zinc phosphide; zinc oxide; sodium bicarbonate; and boracic acid, in substantially the proportions set forth.

2. A composition of the class described including zinc phosphide, 7 parts; zinc oxide, 3½ parts; sodium bicarbonate, 14 parts; boracic acid, 10½ parts; all by measure.

3. A composition of the class described comprising zinc phosphide; zinc oxide; sodium bicarbonate; and a suitable carrying agent for rendering the composition plastic, substantially in the proportions described.

4. A composition of the class described including zinc phosphide, 7 parts; zinc oxide, 3½ parts; sodium bicarbonate, 14 parts; boracic acid, 10½ parts; and vaseline, 10 to 20 parts.

5. A composition of matter for use in welding or soldering precious metals and their alloys, and including the following ingredients in substantially the following proportions by measure: zinc phosphide, 2 parts; zinc oxide, 1 part; sodium bicarbonate, 4 parts; boracic acid, 3 parts; and a suitable carrying agent in a semi-liquid form, substantially 3 to 6 parts.

In testimony whereof I have signed my name to this specification in the presence of two subscribing witnesses.

ABRAHAM BAEWSKIN.

Witnesses:
MARGARET AUER,
JOSHUA R. H. POTTS.